US008201868B2

(12) United States Patent
Hamilton

(10) Patent No.: US 8,201,868 B2

(45) Date of Patent: Jun. 19, 2012

(54) GATE REMOVAL ASSEMBLY AND RELATED STORAGE SYSTEMS FOR USE WITH HAULING AND TRANSPORT VEHICLES

(76) Inventor: Ken Hamilton, Menifee, CA (US)

( * ) Notice: Subject to any disclaimer, the term of this patent is extended or adjusted under 35 U.S.C. 154(b) by 291 days.

(21) Appl. No.: 12/501,104

(22) Filed: Jul. 10, 2009

(65) Prior Publication Data

US 2010/0147786 A1 Jun. 17, 2010

Related U.S. Application Data

(60) Provisional application No. 61/079,756, filed on Jul. 10, 2008, provisional application No. 61/098,129, filed on Sep. 18, 2008.

(51) Int. Cl.
*B60P 1/273* (2006.01)

(52) U.S. Cl. ........................................... 296/50; 296/52

(58) Field of Classification Search .................... 296/50, 296/52, 53, 59; 211/86.01; 254/130
See application file for complete search history.

(56) References Cited

U.S. PATENT DOCUMENTS

| | | | | |
|---|---|---|---|---|
| 1,060,715 | A * | 5/1913 | Simpson | 296/52 |
| 1,332,404 | A * | 3/1920 | Manning | 254/130 |
| 1,492,881 | A * | 5/1924 | Issitt et al. | 254/130 |
| 5,529,287 | A * | 6/1996 | Pelosi et al. | 254/130 |
| 2006/0214146 | A1* | 9/2006 | Carmouche | 254/130 |

* cited by examiner

*Primary Examiner* — Lori Lyjak
(74) *Attorney, Agent, or Firm* — Sandra Poteat Thompson; Buchalter Nemer

(57) ABSTRACT

Gate removal assemblies are disclosed herein that include a stabilizing assembly; an adjustment assembly coupled to the stabilizing assembly; and a releasing assembly coupled to the adjustment assembly. Gate rack assemblies are also disclosed that includes a coupling mechanism, and at least one support mechanism. Gate removal systems are disclosed herein and include at least one gate removal assembly, and at least one gate rack assembly. In some embodiments, gate removal systems further include a gate removal assembly caddy.

12 Claims, 6 Drawing Sheets

FIG. 1
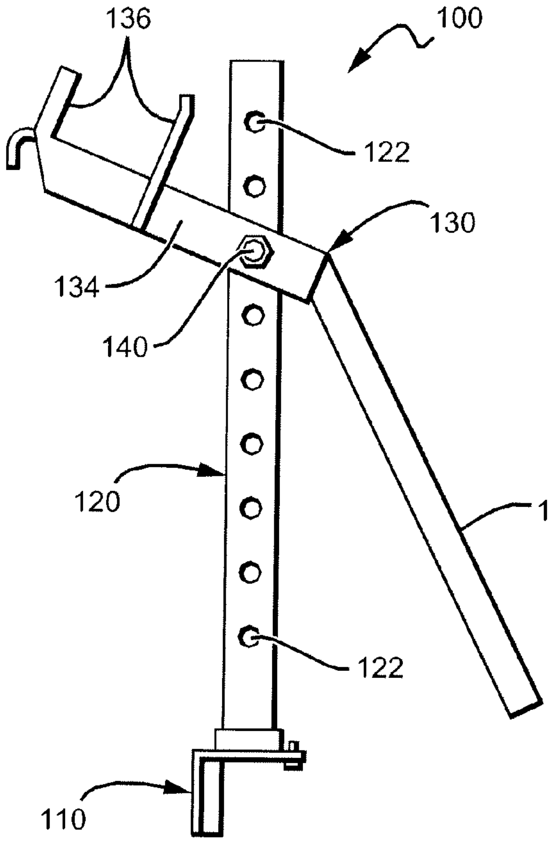
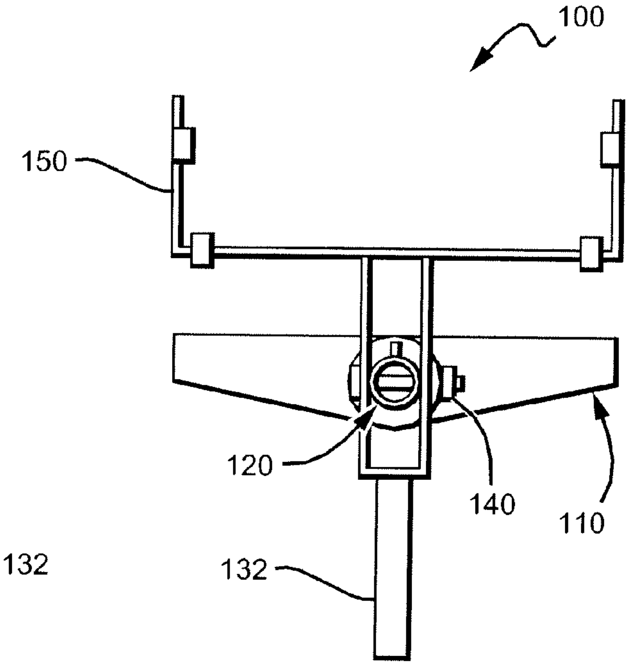
FIG. 2
FIG. 3A
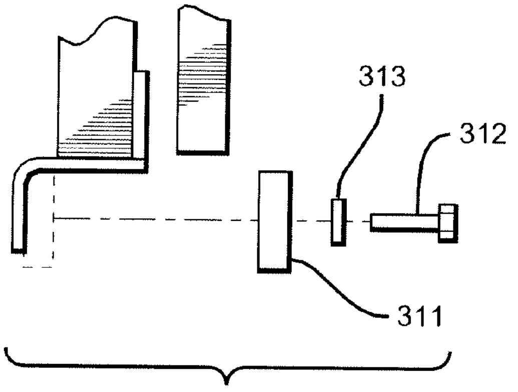
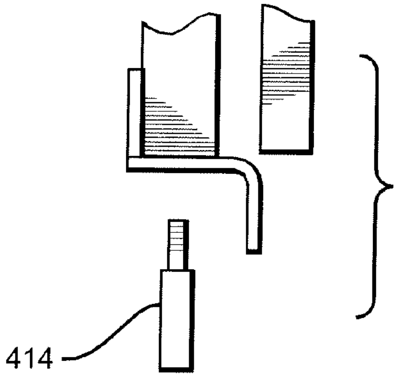
FIG. 4A

GATE REMOVAL ASSEMBLY AND RELATED STORAGE SYSTEMS FOR USE WITH HAULING AND TRANSPORT VEHICLES

This application is a United States Utility Application that claims priority to U.S. Provisional Application Ser. No. 61/079,756 filed on Jul. 10, 2008 and U.S. Provisional Application Ser. No. 61/098,129 filed on Sep. 18, 2008, both of which are incorporated herein in their entirety by reference.

FIELD OF THE SUBJECT MATTER

The field of the subject matter is a gate and side gate removal assemblies and related storage systems and devices for vehicles designed to haul and transport items.

BACKGROUND

Vehicles designed for hauling and transporting items come with various sides, gates and bed designs in order to facilitate loading and unloading of the vehicle, while making transport of the loads safe and efficient.

U.S. Pat. No. 4,076,310 describes a lift for a truck gate, wherein the truck gate or side gate is hinged and affixed to the side or bottom of the truck. The gates pivot downwardly and outwardly or inwardly and upwardly and the lift facilitates this movement of the side gate, so that the user is not hurt or the cargo damaged. This lift must be installed as a permanent fixture on each truck.

This lift in the '310 patent is not designed, however, for side gates that are designed to be physically removed from the truck, such as so in a stake bed truck where a gate having downwardly pointing stakes is designed to mate with the stake holders or stake pockets on the sides of the trucks. Specifically, as these gates are removed and attached again to the sides of the trucks, the stake holders and/or stake pockets and stakes become deformed, warped or otherwise damaged.

As the gates are forced into the stake holders multiple times, it becomes difficult to pull the side gates out of the stake holders, in order to load and/or remove cargo. Often times a forklift must be employed for assistance. Workers loading and unloading cargo must spend a great deal of time and energy removing the side gates before their work can begin, not to mention injuring their backs, legs and arms in the process. Conventional methods of removing these gates result in a loss of manpower and money, as jobs are held up while workers remove gates and deal with injuries, along with costs to the business in health care coverage and downtime.

It would be ideal if a gate removal system and corresponding storage system were developed that easily allows for the side gates to be removed by utilizing the concept of leverage. It would also be ideal if the gate removal system or assembly, along with the gates, had a simple, straightforward and portable storage system.

SUMMARY

Gate removal assemblies are disclosed herein that include a stabilizing assembly; an adjustment assembly coupled to the stabilizing assembly; and a releasing assembly coupled to the adjustment assembly.

Gate rack assemblies are also disclosed that includes a coupling mechanism, and at least one support mechanism.

Gate removal systems are disclosed herein and include at least one gate removal assembly, and at least one gate rack assembly. In some embodiments, gate removal systems further include a gate removal assembly storage caddy.

BRIEF DESCRIPTION OF THE FIGURES

FIG. 1 shows a side view of gate removal assembly 100 that comprises a stabilizing assembly 110, an adjustment assembly 120 coupled to the stabilizing assembly 110 and a releasing assembly 130 coupled to the adjustment assembly 120.

FIG. 2 shows a top perspective of the gate removal assembly 100 from FIG. 1.

In FIGS. 3 and 3A, base spacer blocks 311, along with spacer block bolts 312 and washers 313, are used to help stabilize the gate removal assembly.

In FIGS. 4 and 4A, a threaded base dowel 414 is used to help stabilize the gate removal assembly.

Figure 8:
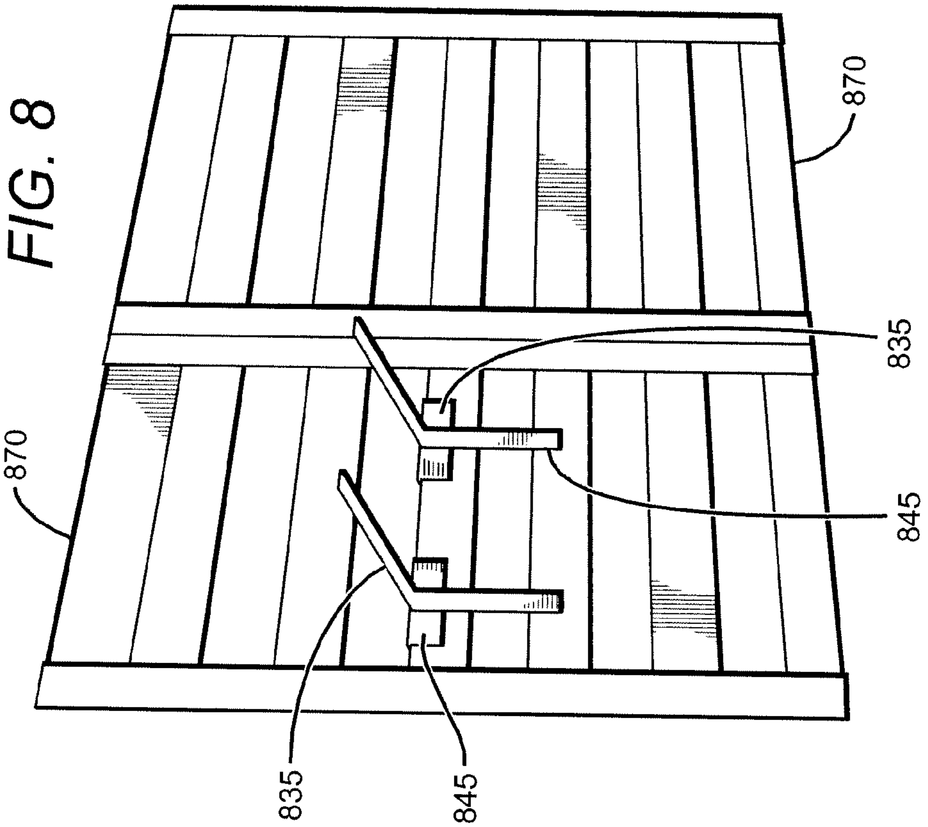

In another embodiment, a gate rack assembly, which is shown in FIG. 8, can be provided as part of a contemplated gate removal system, where the gate rack assembly holds a plurality of gates 870, once they are removed.

Figure 9:
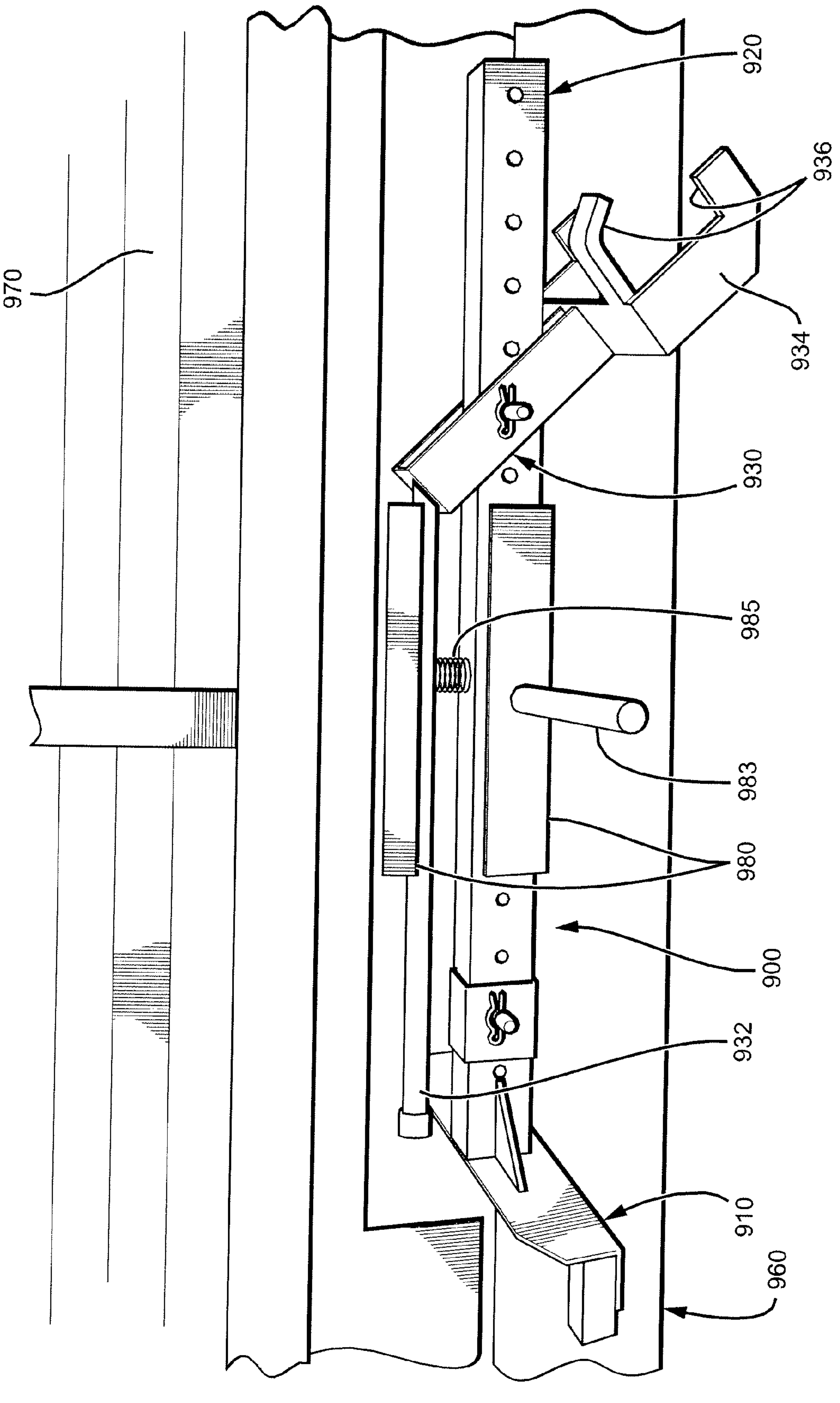

In FIG. 9, a gate removal assembly 900 is shown secured in a gate removal assembly storage caddy 980.

Figure 10:
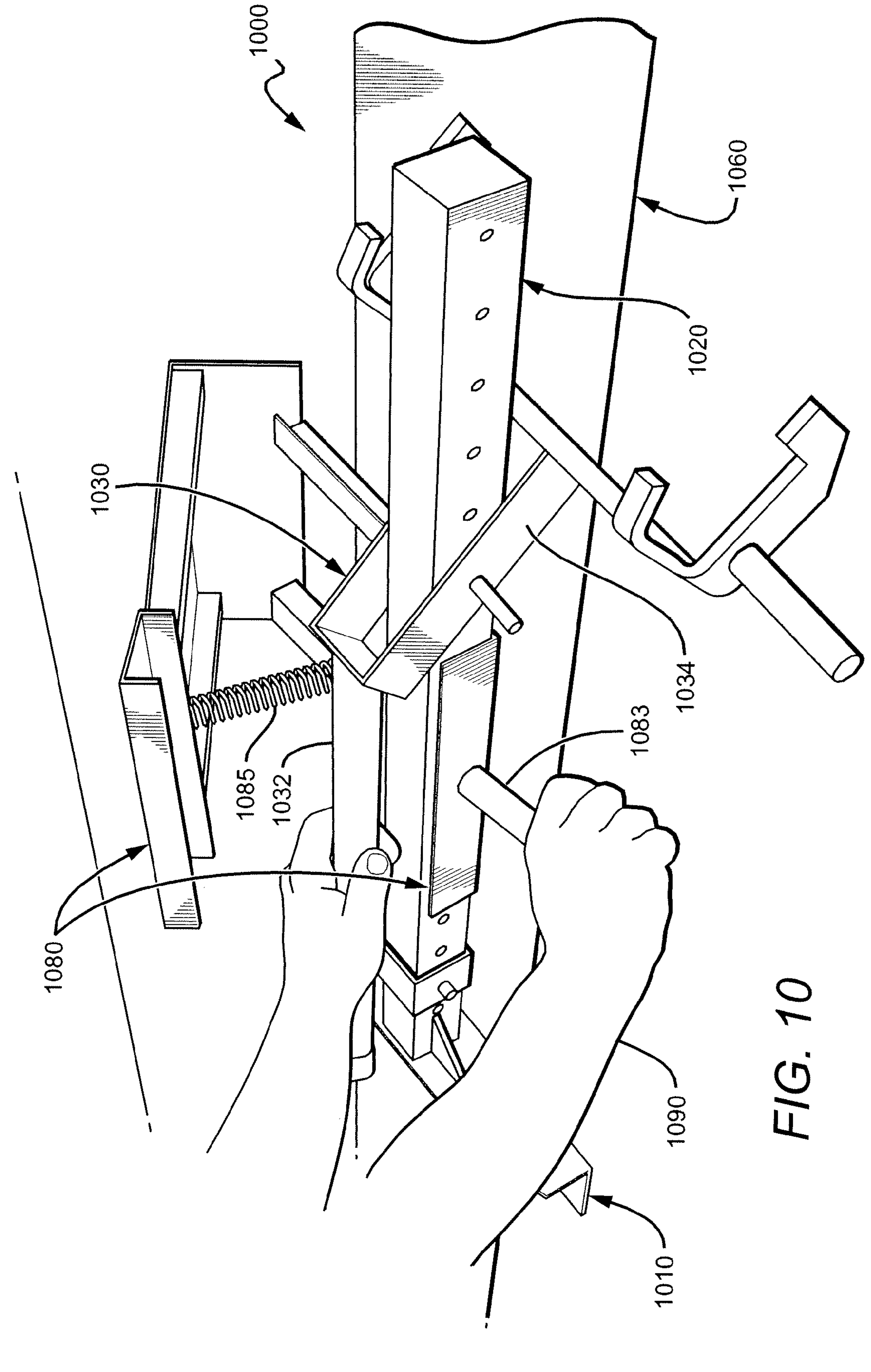

In FIG. 10, a gate removal assembly 1000 is shown secured in a gate removal assembly storage caddy 1080.

DETAILED DESCRIPTION

Figure 6:
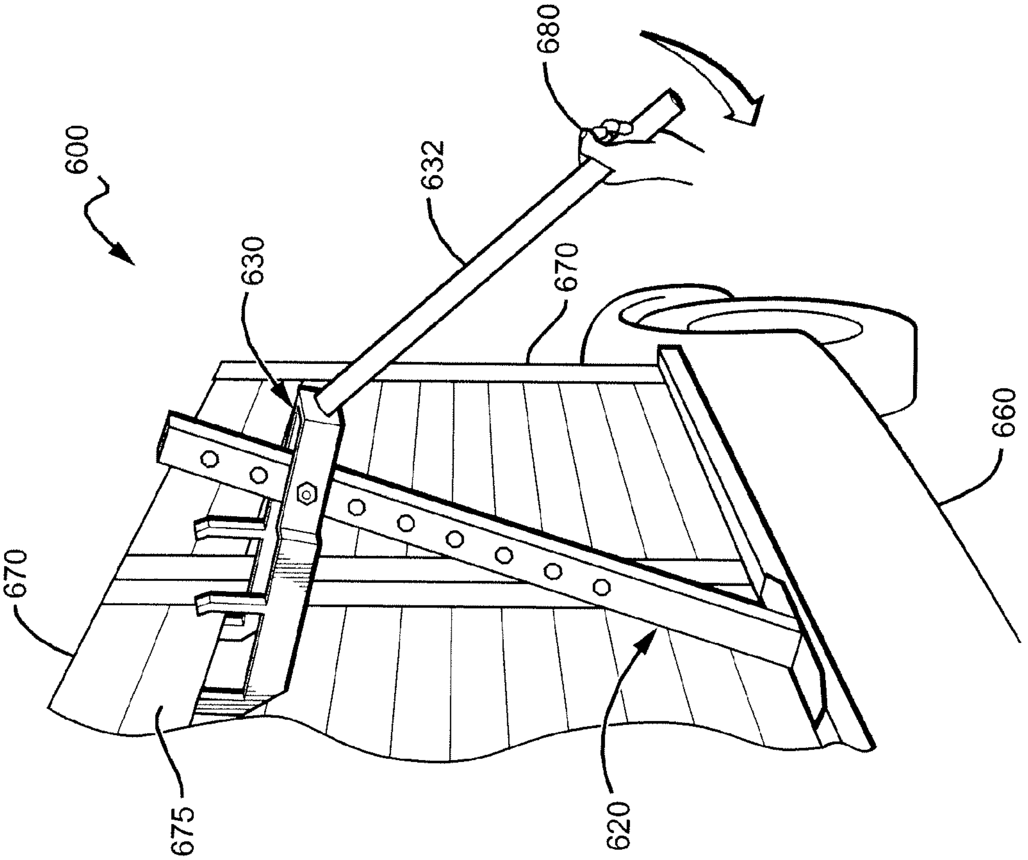
In FIG. 6, the gate removal assembly 600 is coupled to the side of the truck 660 by the gate 670 that needs to be removed.
Figure 7:
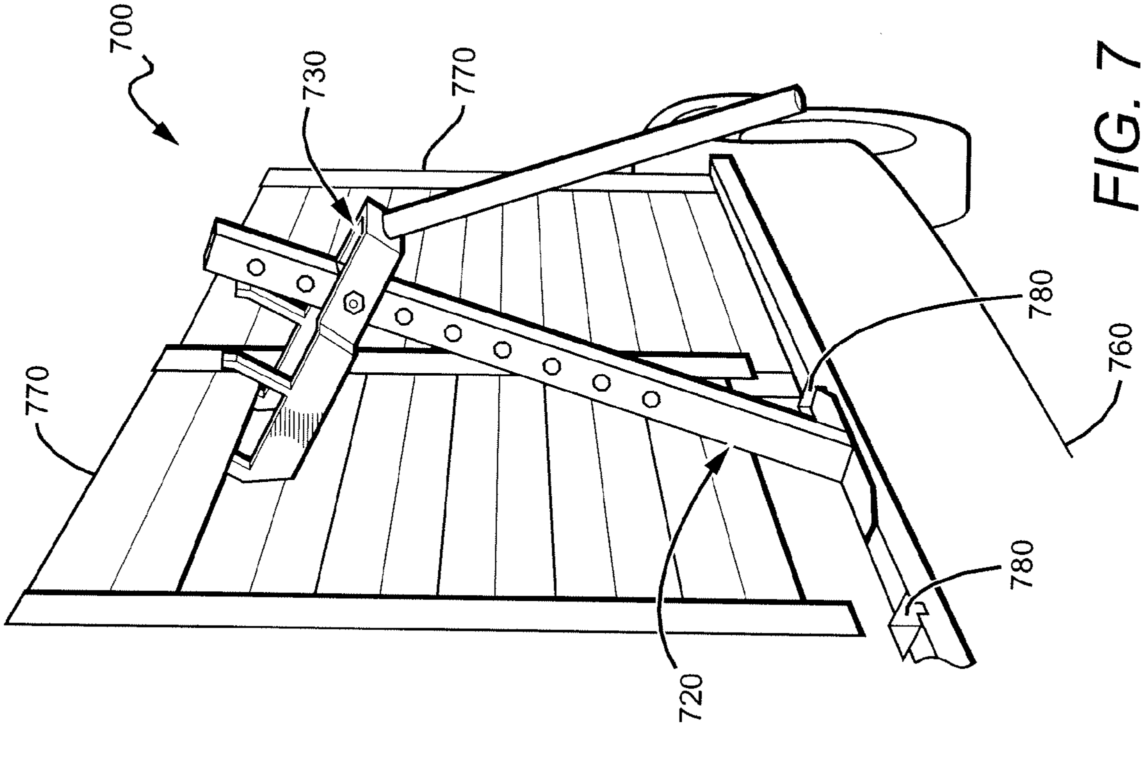
In FIG. 7, the gate removal assembly 700 is coupled to the side of the truck 760 by the gate 770 that is in this figure, being removed.

Surprisingly, a gate removal system comprising a corresponding storage system has been developed and is shown in FIGS. 1-4, 8 and 9-10. FIGS. 5-7 show a contemplated gate removal assembly in use. This new device is portable, easily attached on the truck bed where needed, and removed after use, for use with the next gate. As used herein, the phrase "gate removal system" comprises a gate removal assembly, a gate rack assembly, a gate removal assembly storage caddy or a combination thereof.

Gate removal assemblies are disclosed herein that include a stabilizing assembly; an adjustment assembly coupled to the stabilizing assembly; and a releasing assembly coupled to the adjustment assembly. Gate rack assemblies are also disclosed that includes a coupling mechanism, and at least one support mechanism.

In some contemplated embodiments, the releasing assembly of the gate removal assembly comprises a handle and a lifting mechanism. In some embodiments, the handle and the lifting mechanism are coupled to one another by any suitable coupling mechanism, including a hinge. In other embodiments, the handle and the lifting mechanism may comprise or form one continuous piece of material. In a contemplated embodiment, a lifting mechanism comprises a grip attachment.

In some embodiments, a contemplated stabilizing assembly comprises a coupling mechanism allowing it to be coupled to a vehicle. In other embodiments, a contemplated stabilizing assembly comprises a platform allowing it to be stabilized on a flat surface which may include the ground or a truck bed.

In some embodiments, a contemplated adjustment assembly comprises a plurality of adjustment points, wherein the adjustment points comprise at least one hole, notch or combination thereof. In some embodiments, the adjustment assembly comprises a plurality of holes and an adjustment piece, wherein the adjustment piece fits through an opening on the releasing assembly and through at least one hole on the adjustment assembly.

Gate removal systems are disclosed herein and include at least one gate removal assembly, and at least one gate rack assembly. In some embodiments, gate removal systems further include a gate removal assembly caddy.

FIG. 1 shows a side view of gate removal assembly 100 that comprises a stabilizing assembly 110, an adjustment assembly 120 coupled to the stabilizing assembly 110 and a releasing assembly 130 coupled to the adjustment assembly 120. The adjustment assembly 120 comprises a plurality of adjustment points 122, which in this figure are shown as holes that pass through the adjustment assembly. The releasing assembly 130 in this embodiment comprises a handle 132 and lifting mechanism 134. The lifting mechanism 134 comprises a grip attachment 136, wherein the grip attachment 136 is adjustable, such as what might be seen with a vice grip. The releasing assembly 130, in this embodiment, is coupled to the adjustment assembly 120 by using a nut and bolt pair 140. FIG. 2 shows a tap perspective of the gate removal assembly 100 from FIG. 1 coupled to a gate 150.

FIGS. 5-7 show the gate removal assembly in use. In FIG. 5, the gate removal assembly 500 is positioned to be attached to the side of the truck 560 by the gate 570 that needs to be removed. Note that the adjustment assembly 520 and releasing assembly 530 are assembled, but the gate removal assembly 500 is not coupled to the gate 570 yet. The stabilizing assembly 510 is in position to be coupled with the truck 560. In FIG. 6, the gate removal assembly 600 is coupled to the side of the truck 660 by the gate 670 that needs to be removed. Note that the adjustment assembly 620 and releasing assembly 630 are assembled. The gate removal assembly 600 is now also coupled to one of the rails 675 of the gate 670. A user (hand shown as 680) is ready to apply downward pressure to the handle 632 in order to remove the gate 670 from the truck 660. In FIG. 7, the gate removal assembly 700 is coupled to the side of the truck 760 by the gate 770 that is, in this figure, being removed. Note that the adjustment assembly 720 and releasing assembly 730 are assembled. The gate removal assembly 700 is now removing the gate 770 from the truck 760. In this figure, the vacated stake holders 780 are shown where the gate 770 has been removed.

In another embodiment, a gate rack assembly, which is shown in FIG. 8, can be provided as part of a contemplated gate removal system, where the gate rack assembly holds a plurality of gates 870, once they are removed. Contemplated gate rack assemblies comprise at least one coupling mechanism and at least one support mechanism.

Contemplated coupling mechanism comprise any suitable bolt, fixture or anchor that allows the gate rack assembly to be securely coupled to a vehicle or truck, securely coupled to the at least one support mechanism, while at the same time allowing the gate rack assembly to be easily removed when necessary. Contemplated support mechanisms comprise any suitable arms, extensions or storage fixtures that can be coupled to the coupling mechanism, while at the same time supporting at least one gate, and in many embodiments, several gates.

It is contemplated that the gate rack assembly does not have to be permanently installed, it has long “arms” 835, is easily coupled to several points on a truck (not shown) through coupling joints 845, and is portable. In some embodiments, each gate rack assembly can hold up to six gates at once, with two sets used for maximum load accessibility. Additional benefits of a contemplated gate rack assembly are: no more stooping over to lift gates that are stacked on the pavement, easy repositioning of the trucks when requested by the customer, and no more damage to truck tires or cabs from stacked gates or to the gates themselves from being slammed on the ground in haste or frustration.

Contemplated gate rack assemblies are different than anything currently used in the industry, including what are called “gate caddies”, because these gate caddies are smaller, permanently affixed to the truck and can only hold one gate. These gate caddies are also not widely used, if at all, primarily because they are not suitable for real-world applications. If one wants to load more gates—multiple sets of gate racks must be installed, since each gate caddy can only hold one gate. So, for example, twenty gate caddies would need to be installed to hold the gates for an entire ten gate flat bed truck.

In contemplated embodiments, a gate removal assembly storage caddy can be provided on the truck and/or truck underside, such that the gate removal assembly can be easily stored and removed by the user. A contemplated gate removal assembly storage caddy is shown in FIGS. 9 and 10 in use. In FIG. 9, a gate removal assembly 900 is shown secured in a gate removal assembly storage caddy 980. This gate removal assembly 900 that comprises a stabilizing assembly 910, an adjustment assembly 920 coupled to the stabilizing assembly 910 and a releasing assembly 930 coupled to the adjustment assembly 920. The releasing assembly 930 in this embodiment comprises a handle 932 and lifting mechanism 934. The lifting mechanism 934 comprises a grip attachment 936, wherein the grip attachment 936 is adjustable, such as what might be seen with a vice grip. The user (not shown), in this embodiment, pulls down on the handle 983 to open the spring-loaded (spring shown as 985) storage caddy 980, whereby the gate removal assembly 900 can be easily removed. The gate 970 that needs to be removed is also shown, along with the underside of the truck 960.

In FIG. 10, a gate removal assembly 1000 is shown secured in a gate removal assembly storage caddy 1080. This gate removal assembly 1000 that comprises a stabilizing assembly 1010, an adjustment assembly 1020 coupled to the stabilizing assembly 1010 and a releasing assembly 1030 coupled to the adjustment assembly 1020. The releasing assembly 1030 in this embodiment comprises a handle 1032 and lifting mechanism 1034. The user 1085, in this embodiment, pulls down on the handle 1083 to open the spring-loaded (spring shown as 1085) storage caddy 1080, whereby the gate removal assembly 1000 can be easily removed. The gate that needs to be removed is not shown, but the underside of the truck 1060 is shown in this Figure. The user 1085 then allows the bottom of the spring-loaded storage caddy to transition back to the closed position.

Contemplated gate removal assemblies, gate removal assembly storage caddies, gate removal systems, gate rack assemblies and other related components may be constructed from any suitable material, such as metals, composite materials, heavy-duty plastics or other materials where the ultimate lift mechanism is capable of forcing, through the use of leverage, a side gate out of the stake holders in the tops and/or sides of a truck bed. They may be coated or treated with any material or by a suitable treatment method in order to make the components more durable or able to withstand the elements.

EXAMPLES

Example 1

Dimensions of a Contemplated Embodiment

| Gate Removal Assembly | | |
|---|---|---|
| Total weight: | approx 9-12 lbs | |
| Adjustment Assembly | tubing: | 2 inch square, radius corners |
| | height: | 33 inches |
| | width: | handles—24 inches |
| | base— | 15¾ inches |
| | depth: | boxed—9¼ inches |
| Handle | diameter: | 1½ inches |
| | length: | 24 inches |
| Grip Attachment | length flat surface: | 3.5 inches |
| Assembled Dimensions: | Min 34" × 24" × 9¼" | Max 41.5" × 24" × 9¼" |

| Gate Rack Assembly | |
|---|---|
| Total weight | 9 lbs each/18 lbs per set |
| Length straight across end to end | 34 inches |
| Flange | 8" width × 6" × ⅛" Bent into U shape |
| Arm flat stock | 40" × 1½" × ⅜" |
| Structural gusset flat stock | 17¾" × 1" × 3/16" |

| TRUCK GATES International Freightliners 24 foot Morgan Truck Body | |
|---|---|
| Wooden rung | 43 lbs |
| Steel rung | 53 lbs |
| H × W | 46" × 59" |
| pocket depth | 4½" |
| installed | 41½" from bed to top |
| total height | 7¾ ft from pavement to top |

| 550 Ford Flatbed Arrow Truck Body | |
|---|---|
| weight | 44 lbs |
| H × W | 48" × 48" |
| pocket depth | 5" |
| installed | 43" from bed to top |

| Royal Truck Body | |
|---|---|
| weight | 39 lbs |
| H × W | 47" × 48" |
| pocket depth | 5" |
| installed | 42" from bed to top |

Example 2

Instructions for Use for a Contemplated Embodiment

A contemplated Gate Removal System assists in the removal of the side and rear gates from the pockets of Stake-Bed Trucks. The system comprises three components: one Gate Removal Assembly for removing the gates and a Gate Rack Assembly for storing the removed gates while the cargo is loaded or unloaded.

I. Parts

Figure 3:
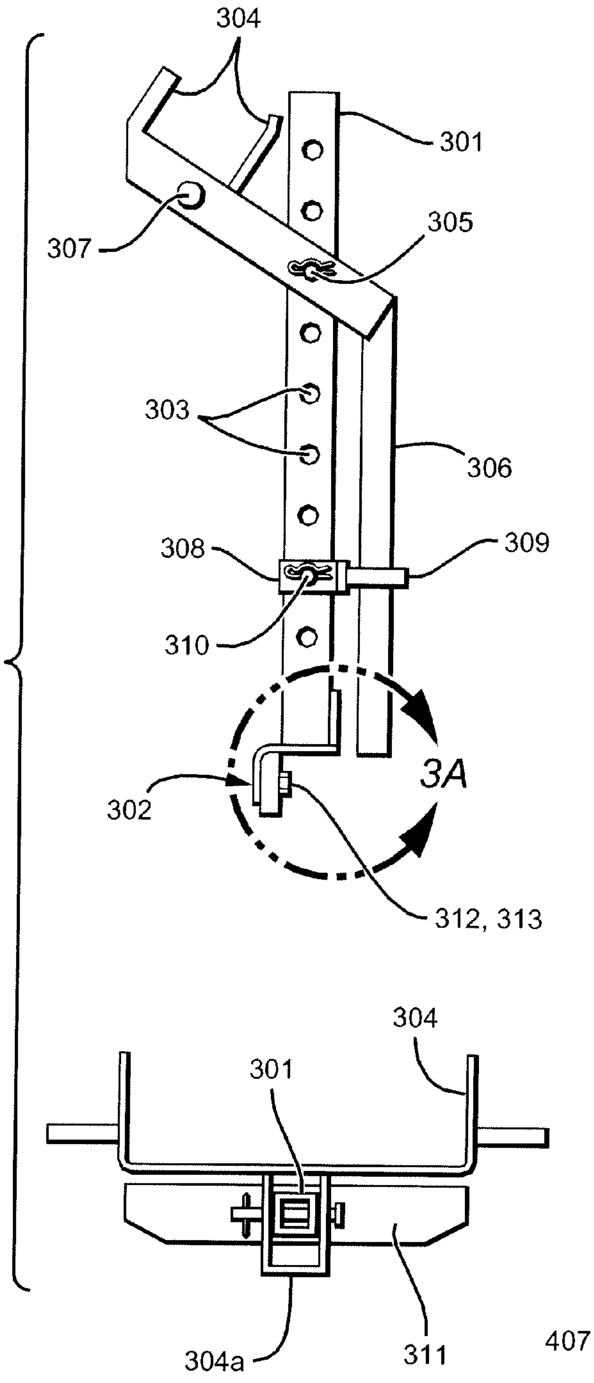
Figure 4:
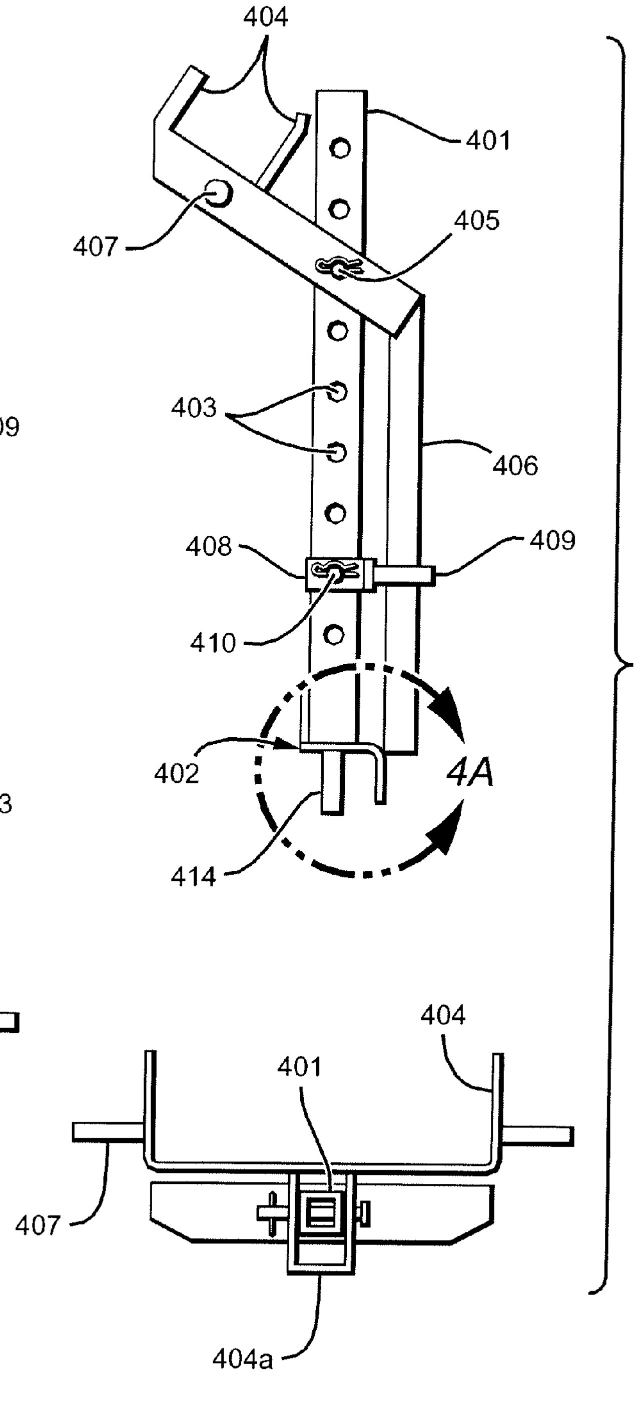
Figure 5:
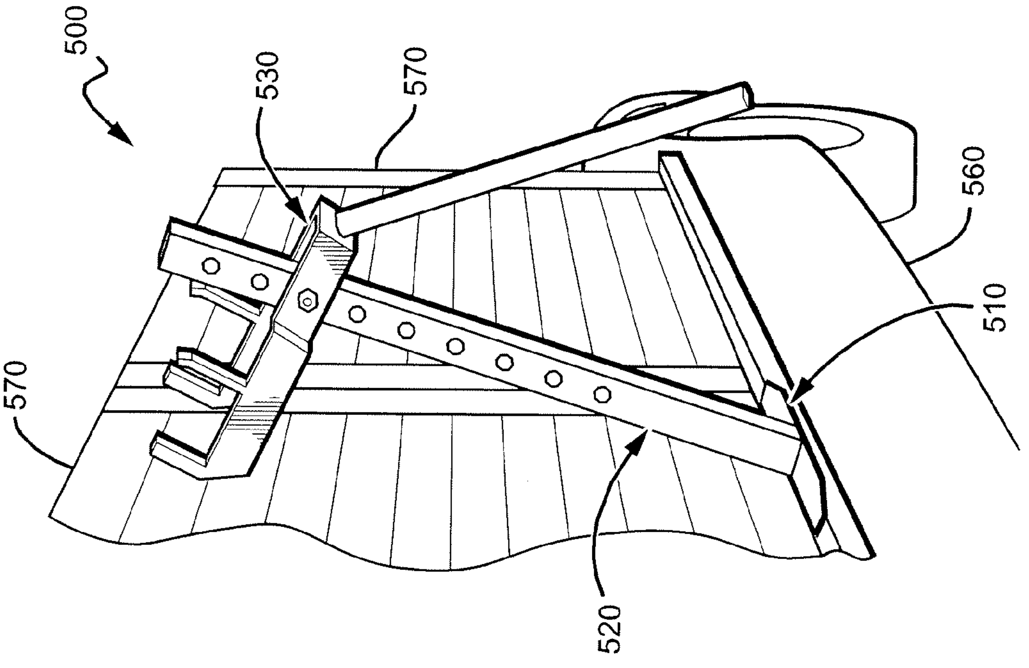
In FIG. 5, the gate removal assembly 500 is positioned to be attached to the side of the truck 560 by the gate 570 that needs to be removed.

FIGS. 3 and 4 show a gate removal assembly, wherein the removal assembly is utilized with two different types of bed rails—an inner rail and outer rail arrangement (FIGS. 3 and 3A) or a single rail arrangement (FIGS. 4 and 4A). An adjustment assembly is shown that includes a tower (301, 401) and adjustment points or holes (303, 403). The adjustment assembly is coupled to a base or stabilizing assembly (302, 402).

A contemplated releasing assembly is coupled to the adjustment assembly through an adjustment pin (305, 405) wherein the releasing assembly comprises a lifting mechanism (304*a*, 404*a*) and a grip attachment (304, 404) coupled to a handle (306, 406). Grip handles (307, 407) are also located on the grip attachment (304, 404).

In this embodiment, a spring assembly is coupled to the adjustment assembly to hold the handle in a closed position. The spring assembly comprises a spring clip collar (308, 408), a spring clip (309, 409) and a clip adjustment pin (310, 410).

In FIGS. 3 and 3A, base spacer blocks 311, along with spacer block bolts 312 and washers 313, are used to help stabilize the gate removal assembly. In FIGS. 4 and 4A, a threaded base dowel 414 is used to help stabilize the gate removal assembly.

II. Unit Assembly

The gate removal system, including the gate removal assembly and gate rack assembly is for use on stake bed trucks with various rails.

The most common truck bed rails are single rail and double railed. The unit can be adapted for either type by choosing the proper position for the tool, as shown in the table below. Determine which position your truck requires, then follow the instructions below to assemble the base or stabilizing assembly of the gate removal assembly.

| POSITION A (FIGS. 3 and 3A) | |
|---|---|
| Type of Bed Rail | Inner Rail and Outer Rail |
| Tool Parts | Adjustment assembly components, releasing assembly components, Spring Clip components, 2 Base Spacer Blocks 2 Spacer Bolts |
| Base Assembly | With the short side of the Base (302) toward you and long side toward the truck rail, attach the two Spacer Blocks (310) into the base. Using a lock washer under each Spacer Bolt (311), insert the bolt through the block into the base, (see Detail 3A) |

-continued

| POSITION A (FIGS. 3 and 3A) | |
|---|---|
| Tool Positioning | Tighten the bolt into the threaded hole on the base lip. FINAL TIGHTEN WITH A WRENCH. You must use both spacer blocks. When installing the gate removal assembly for use, the two Spacer Blocks fit between the two truck rails to provide stability. |

| POSITION B (FIGS. 4 and 4A) | |
|---|---|
| Type of Bed Rail | Single Rail |
| Tool Parts | Adjustment assembly components; releasing assembly component; Spring Clip components; Threaded Base Dowel; Pre-drilled ⅞" dowel hole in rail for each gate. TO DRILL THE HOLES: Mark the rail, each gate needs one ⅞" hole midway between it's stakes, centered 1" from outer edge of rail. Use a ⅞" step bit to drill, and file the edges with ½" round file. |
| Base Assembly | With the long side (radius curve) of the Base (402) towards you, insert the Base Dowel (412) into the threaded hole in the center of the Base, and thread in. FINAL TIGHTEN WITH A WRENCH (See Detail 4B) *As an option, the two spacer bolts can be used to lessen the gap. Insert them through the lip of the base and thread them evenly toward the truck rail with your fingers. To allow for easy use, do not make a tight fit. |
| Tool Positioning | When installed, the base dowel fits into the pre-drilled hole on the truck rail with the lip of the Base or stabilizing assembly against the outer side of the rail. The base lip provides tool stability by limiting the movement of the adjustment assembly. |

Releasing Assembly and Adjustment

The gate removal assembly is designed for use on any type of gate for a stake bed truck. The standard tool will fit most applications, but customized tools are available.

1. Once the stabilizing assembly is assembled properly for your type of truck, you must attach the releasing assembly to the adjustment assembly. The grip attachment should point away from you and toward the truck, with the handle pointing towards you.
2. The adjustment assembly has a plurality of adjustment holes to allow for proper positioning of the releasing assembly according to which rung will be used for removal of the gate. Typically, the second rung down from the top of the gate works best and provides the best balance when carrying the gate. For most gates, this requires use of the fourth hole down for the adjustment pin.
3. The adjustment pin couples the releasing assembly to the adjustment assembly. Lower the releasing assembly over the top of the adjustment assembly until the adjustment holes lines up with the desired adjustment assembly hole. Insert the adjustment pin all the way through the adjustment assembly and both sides of the releasing assembly. Secure the adjustment pin by the retaining clip with the cable passing OVER the handle. DO NOT USE THE ADJUSTMENT PIN WITHOUT USING THE RETAINING CLIP.
4. The Spring Clip (308, 408) is adjustable for maximum latching action, but is normally positioned at the ninth hole below the releasing mechanism. It may be moved up or down if needed by removing the adjustment, sliding the clip up or down, reinserting the pin into the desired hole, and securing with the retaining clip.

Once the gate removal assembly has been assembled and adjusted for use on the gates of the particular truck, no further adjustment should be necessary for future use of the system on that vehicle.

FOR USE ON TRUCK FLEETS: You may wish to mark each gate removal assembly with an I.D. number matching the truck to which it is fitted. For under-bed storage, a toolbox size of 4 ft×18 in×18 in, with the jack fitting diagonally, holds the system well.

III. Using the Assembly and System

1st Step Installing the Gate Rack Assembly (FIG. 8)

1. With consideration of the load to be loaded or unloaded, designate a strategic gate to install the gate rack assembly for holding the gates. Be sure to consider the order you need to use in gate removal, i.e.: do not designate a rear gate that needs to be removed for long pipe.

The gate you designate must be in good repair and able to accommodate both Hangers spaced 18" to 24" apart.

Install the gate rack assembly on the same gate, on the 2nd rung up from the truck bed. If your truck has a lift, and your designated gate is a rear gate, then put the Hangers on the 3rd rung up from the truck bed, which will allow clearance for stacked gates.

2. To Install the gate rack assembly, place the coupling mechanism onto the top side of the rung and slide all the way down until the gate rack assembly is firmly in place. The support mechanisms should be spaced 18" to 24" apart. To avoid placing gates on the ground, always measure first and be sure to accommodate the narrowest gate you will be hanging. After the first few uses, you will be able to visually gauge the correct spacing.
3. Once both support mechanisms are installed on the designated gate, you are ready to begin removing the gates from the truck.

2nd Step Removing the Gates

1. The gate removal assembly must be assembled and adjusted for the truck and the rails on the truck bed. Use either Position A or Position B.
2. Pick up the gate removal assembly with the grip attachment pointing upward and the handle locked into the spring clip.

3. Position A

Place the base of the gate removal assembly on the truck's outer side rail, with the radius spacer cutout straddling the pipe spacer on the truck. The lip of the stabilizing assembly should be between the inner rail and the outer rail. The base of the gate removal assembly should rest flush on the outer rail. When properly placed, the gate removal assembly will have limited mobility. The spacer blocks will restrict the tool's back and forth movement, and keep it in place.

4. Position B

With the Base Dowel (413) firmly threaded into the Base (402), insert the dowel into the pre-drilled hole in the truck rail. The gate removal assembly should have limited mobility. For rails with a wider than usual gap, the two Spacer Bolts may be used as adjustment bolts to limit back and forth movement of the tool while on the rail.

5 If the gate has manual latches, unlatch them before using the tool.

6. With the tool firmly in place, unhook the handle from the spring clip. Raise the handle upward until the grip attachment clears the bottom of the rung it will be used on. The grip attachment will go underneath the rung, and will lift the gate by the rung.

7. Push the adjustment assembly of the gate removal assembly towards the gate to insert the grip attachment beneath the designated rung.

8. If the gate has a latch release, then depress the latch release with one hand while lowering the handle with your other hand.

9. Once the gate is unlatched, simply lower the handle all the way down until the handle snaps into the spring clip mounted on the adjustment assembly.

10. For a stubborn gate, DO NOT USE FORCE: use finesse. It may be necessary to loosen a stuck gate by simultaneously jiggling the gate while lowering the handle. Allow the leverage to do the work. Extreme pressure on the handle will break the tool.

*Make sure the gate is not still latched to the truck or to another gate, or permanently affixed by screws or welded; or bound up by truck cargo.

11. The gate is now staged for moving. Use the palm of your hands to grab the two upper handles of the gate removal assembly, as illustrated. Your fingers should be extended straight up on your side of the rung, and your thumbs should go under the handle, and be pointed away from you. Do not wrap your fist around the handle, you lose stability. Incorrect position can result in pinched fingers.

12. Pick up the gate using the handle located on the releasing assembly, with your fingers on the rung. If you try to pick up the gate by the rung only, the gate removal assembly will fall off.

13. While holding the handles with an open palm, carry the gate removal assembly with the gate, with your arms extended upward. There is no need to lower the gate to chest height because you must have it raised to slide onto the gate rack assembly.

3rd Step Stacking the Gates on the Gate Rack Assembly

1. While holding the handles, carry the gate removal assembly with the gate to the gate rack assembly. Place the top gate rung onto the support mechanisms, and allow the gate to slide onto the support mechanisms until it rests against the fixed gate.

2. As the gate comes to rest on the support mechanism, the gate removal assembly will automatically release itself.

3. Repeat steps 2-12 for each additional gate. Each gate rack assembly holds multiple gates.

IV. When Load is Finished

Reinstalling the Gates

1. When finished loading or unloading the cargo, replace the gates on the truck and latch. Be sure to secure each gate before moving the truck.

2. Remove the gate rack assembly from the truck gate.

Do not drive the truck on the street with the gate rack assembly installed on it.

Their orange paint makes them highly visible in the side view mirrors.

3. Should a wide load render it impossible to use your gates because the pockets are covered, you may install the gate rack assembly on the INSIDE of a rear gate and stack your unused gates on them while you transport the load. This will keep the gates in a neat stack, but be sure to use a rope or a strap to secure them in case of bouncing.

Stowing the Gate Removal Assembly

1. Stow the gate rack assembly either in the truck bed, or in a specially designated Tool Box.

2. Stow the gate removal assembly either on the passenger floorboard, with the seatbelt over the grip attachment, or in a specially designated Tool Box or gate removal assembly caddy.

DO NOT TRANSPORT THE gate removal assembly ON A TRUCK SEAT. You could receive a ticket for unsecured cargo if you do so.

3. The optimum storage for the gate removal assembly is in an under-body gate removal assembly storage caddy. A ready-made box is another option with the dimensions of 18" by 18" by 4' will also accommodate the gate rack assembly, and the gate removal assembly, if the gate removal assembly is situated on an angle, corner to corner.

Example 3

Benefits of Use of a Contemplated Embodiment

| CATEGORY | ITEM | CURRENT METHOD | BENEFIT OF TOOL TO ITEM |
|---|---|---|---|
| Ease of Use | Labor used | Manual Force: manpower strength, human muscles | Mechanical Force: Leverage—one of the 6 basic principles |
| | Difficult Gate | Additional manual exertion to force gate loose or use of a forklift to lift gate | Leverage provides necessary lifting force; does not require extra muscle strength; renders forklift use unnecessary |
| | Frustration of stuck gates | Operator drops gate to ground in frustration and causes equipment damage | Operator will better care for equipment and acquire improved equipment handling skills |

-continued

| CATEGORY | ITEM | CURRENT METHOD | BENEFIT OF TOOL TO ITEM |
|---|---|---|---|
| | Gate retrieval | If asked to relocate the truck during unloading, the operator must retrieve all the gates, move the truck, and then restack all the gates. | With the gates stored on the hangers, truck relocation requires only the actual time needed to move the truck. |
| Safety | Back & Shoulder Injuries | Average weight of gate is 39-53 lbs Repetitive stooping and lifting motions along with additional strain for stuck gates results in a significant number of work related injuries. | Use of leverage reduces risk exposure by reducing strain at stuck gates. Chest height gate storage reduces risk exposure by eliminating stooping, and the lifting of gates from ground level |
| | Poor Safety Practices | Disregard of gates leads to misuse and unsafe practices, such as leaning gates against truck to climb onto truck bed. | Proper handling fosters increased safety awareness. Storage upon hangers discourages misuse of gates and truck body. |
| Equipment | Gate Damage | Rungs damaged from use of a forklift to lift the gate. Latches and hardware are damaged, and gates don't latch properly. | Rungs protected from forklift damage, need less repair or replacement. The gates retain their shape and proper functionality. |
| | | Gates run into by fork lifts or run over by trucks often require complete replacement. | Gates are stored out of harm's way upon the hangers are saved from being rendered unusable. |
| | | Stake ends are smashed and bent from ground contact, ensuring future difficulty with the gate. | Hanging the gates protects the stake ends from damage due to stacking on the ground. Ground contact unnecessary. |
| | Truck Damage | Gates are typically stacked against the truck cab, causing extensive damage over time. | By hanging the gates, the cab is protected from paint and body damage, nor or the wheels scratched by stacked gates. |
| | Cargo Damage | When a forklift is used, the tines can stab the cargo, or push it into the opposing gate | With the gate properly removed, the forklift operator can insert the tines correctly into the pallet to remove it. |
| Expenses | Gate Repair or Replacement | Rungs cost $10-$15 each, plus labor for installation, and down truck time. Gates cost $175 wholesale to $400 dealer price. Typical replacement rate is 2 yrs for wood, 4 yrs for metal. | Gate life is extended during a typical 6-8 yr lease, reducing rung and gate replacement costs by over 100% |
| | Cab Repair | At lease expiration, regulations may require that a cab with prior repair receive a total repaint, at a typical cost of $1500 to the customer. | The cab does not sustain damage from gates leaned against it when the gates are stored upon the hangers. |
| | Productivity | Forklift Time, Repair Time, Down-Truck time, Restacking Gates Time, Man-Hour Loss due to Injuries | Reduces the time needed to deal with problematic situations, and the time lost due to worker back and shoulder injuries. |
| "Green" Compliance | Innovation | Status Quo relies on archaic methods, and human strength alone or improper forklift assistance. | Application of the engineering principle of leverage is an innovative answer to many of the problematic issues in wholesale supply |
| | Cradle To Cradle | Wooden and metal gates and hardware are consumed and replaced. Average gate life is ½ to ⅓ of each lease cycle. | The tool is mfg primarily from recycled aluminum, is made to be used indefinitely, but is recyclable itself. Gate life is extended through preservation. |
| | Sustainability | Avg gate has 4 rungs, avg truck has 10 gates, (40 rungs per truck) Replacement rate: wood—2 sets per 5-7 yr lease (80 rungs); metal—1 set per 5-7 yr lease (40 rungs) | Preservation and reuse of gates results in extended gate life and a tremendous reduction in the consumption of raw materials for replacement parts. |
| | Source Reduction | Raw materials used for replacement parts. Air pollution caused by gate mfg and repainting of truck cabs. | Reduces VOC associated with repainting and gate mfg. A reduces the Carbon and Landfill footprint is achieved through extended gate life. |

-continued

| CATEGORY | ITEM | CURRENT METHOD | BENEFIT OF TOOL TO ITEM |
|---|---|---|---|
| | | | The aluminum industry (vehicle and transportation uses) is expected to become GHG neutral by 2020. |

Thus, specific embodiments and applications of gate and side gate removal assemblies and related storage systems and devices for vehicles designed to haul and transport items s have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A gate removal assembly, comprising:

a stabilizing assembly;

an adjustment assembly coupled to the stabilizing assembly; and a releasing assembly coupled to the adjustment assembly, wherein the releasing assembly comprises a handle and a lifting mechanism and wherein the lifting mechanism comprises a grip attachment.

2. The gate removal assembly of claim 1, wherein the handle and the lifting mechanism are coupled to one another.

3. The gate removal assembly of claim 2, wherein the handle and lifting mechanism form one continuous piece of material.

4. The gate removal assembly of claim 3, wherein the handle and lifting mechanism are hingeably attached to one another.

5. The gate removal assembly of claim 1, wherein the stabilizing assembly comprises a coupling mechanism allowing the stabilizing assembly to be coupled to a vehicle.

6. The gate removal assembly of claim 1, wherein the stabilizing assembly comprises a platform allowing the stabilizing assembly to be stabilized on a flat surface.

7. The gate removal assembly of claim 1, wherein the adjustment assembly comprises a plurality of adjustment points.

8. The gate removal assembly of claim 7, wherein the plurality of adjustment points comprises at least one hole.

9. The gate removal assembly of claim 8, wherein the adjustment assembly comprises a plurality of holes and an adjustment piece, wherein the adjustment piece fits through an opening on the releasing assembly and through at least one hole on the adjustment assembly.

10. The gate removal assembly of claim 1, further comprising at least one gate rack assembly.

11. The gate removal assembly of claim 10, wherein the at least one gate rack assembly holds a plurality of gates.

12. A gate removal system, comprising:

at least one gate removal assembly, at least one gate rack assembly; and a gate removal assembly storage caddy.

* * * * *